(12) United States Patent
Montgomery

(10) Patent No.: US 11,338,280 B2
(45) Date of Patent: *May 24, 2022

(54) CATALYTIC REACTOR SYSTEM TREATMENT PROCESSES

(71) Applicant: USA DeBusk LLC, Deer Park, TX (US)

(72) Inventor: Blake Montgomery, Lumberton, TX (US)

(73) Assignee: USA Debusk LLC, Deer Park, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,074

(22) Filed: Feb. 3, 2020

(65) Prior Publication Data

US 2021/0237047 A1 Aug. 5, 2021

(51) Int. Cl.
*B08B 9/00* (2006.01)
*B01J 38/56* (2006.01)
(Continued)

(52) U.S. Cl.
CPC ............ *B01J 38/56* (2013.01); *B01D 11/0492* (2013.01); *B01J 19/002* (2013.01); *B01J 38/48* (2013.01);
(Continued)

(58) Field of Classification Search
CPC ... B01J 38/48; B01J 2531/90; B01D 11/0492; B01D 2252/20; B01D 2257/108
See application file for complete search history.

(56) References Cited

U.S. PATENT DOCUMENTS 3,480,558 A * 11/1969 Lum ..................... C07C 67/055
502/50
5,035,792 A 7/1991 Foutsitzis et al.
(Continued)

FOREIGN PATENT DOCUMENTS

CN 104946331 A * 9/2015

OTHER PUBLICATIONS

CATnap Catalyst Passivation Process, An Alternative to Inert Entry, www.cat-tech.com, 5 pgs.
(Continued)

*Primary Examiner* — Sharidan Carrillo
(74) *Attorney, Agent, or Firm* — Vincent J. Allen; J. Miguel Hernandez; Carstens & Cahoon, LLP

(57) ABSTRACT

There are provided methods of treating a catalyst-containing reactor system with a liquid solvent to remove contaminants from the reactor system. An exemplary method includes the steps of: isolating the reactor system to be treated from upstream and downstream equipment; reducing the temperature and pressure of the isolated reactor system by flushing with a hydrogen rich gas; injecting a non-aqueous liquid solvent into the reactor system at an injection point while continuously flowing hydrogen-rich gas through the reactor system; maintaining the solvent in a liquid state while flowing the solvent continuously through the reactor system; and terminating the step of injecting solvent and terminating the continuous flowing of hydrogen-rich gas. The exemplary method is free of the injecting of a carrier gas into the reactor system comprising alkanes selected from the methane, ethane, propane, butane and pentane.

20 Claims, 1 Drawing Sheet

(51) Int. Cl.
*B08B 9/027* (2006.01)
*B01J 19/00* (2006.01)
*B01D 11/04* (2006.01)
*B01J 38/48* (2006.01)

(52) U.S. Cl.
CPC ............... *B08B 9/00* (2013.01); *B08B 9/027* (2013.01); *B01D 2252/20* (2013.01); *B01D 2257/108* (2013.01); *B01J 2219/00252* (2013.01); *B01J 2531/90* (2013.01)

(56) References Cited

U.S. PATENT DOCUMENTS

| | | | | |
|---|---|---|---|---|
| 5,830,310 | A * | 11/1998 | Doi | C23C 16/4405 156/345.25 |
| 6,312,586 | B1 * | 11/2001 | Kaines | C10G 65/00 208/108 |
| 6,398,950 | B1 * | 6/2002 | Iwamoto | B01J 23/88 208/216 R |
| 8,480,812 | B2 * | 7/2013 | Nath | C11D 11/0041 134/22.1 |
| 9,017,488 | B2 | 4/2015 | Nath et al. | |
| 2005/0203328 | A1 * | 9/2005 | Glova | B01J 38/12 588/321 |
| 2005/0241670 | A1 * | 11/2005 | Dong | C23C 16/4405 134/1.1 |
| 2010/0210448 | A1 * | 8/2010 | Chiron | C07C 1/24 502/24 |
| 2013/0146088 | A1 * | 6/2013 | Takahashi | B01J 38/56 134/10 |
| 2015/0231611 | A1 * | 8/2015 | Standing | C07C 7/163 585/259 |
| 2017/0072392 | A1 * | 3/2017 | Detjen | C07C 15/08 |
| 2019/0002365 | A1 * | 1/2019 | Patel | C07C 2/08 |

OTHER PUBLICATIONS

Reducing Reactor Turnaround Time, How one German refinery is using CATnap catalyst passivation technology for safer, more efficient Turnarounds, Josef Felser, Dr. George Karl, Ian Baster and Dr. Gary Welch, 2015 ARTC CATnap Article, 11 pgs.
The timely use of chemistry and planning designed to improve client operating margins, Refined Technologies, Strategic Chemistry, Southwest Process Technology Conference, www.r-t-i.com, 19 pgs.
Clearing the Critical Path, James Esteban, Refined Technologies, Inc. USA, Hydrocarbon Engineering, Reprinted from Nov. 2017, www.r-t-i.com, 4 pgs.
Express Entry, Armand Abay, Sean Sears and William F. Johns, Refined Technologies, Inc., USA, Hydrocarbon Engineering, Reprinted from Sep. 2016, www.r-t-i.com, 6 pgs.
Optimising Hydroprocessing Turnarounds, by James Esteban, Refined Technologies, Inc., www.eptq.com, Revamps 2018.
QTRX2, Traditional Clearing Process, https://www.youtube.com/watch?v=PYu852Aw-lg&t=12s, 2 pages.
U.S. Patent and Trademark Office Before the Patent Trial and Appeal Board, Case No. IPR2019-01540, Patent Owner's Preliminary Response dated Dec. 13, 2019, 36 pages.

* cited by examiner

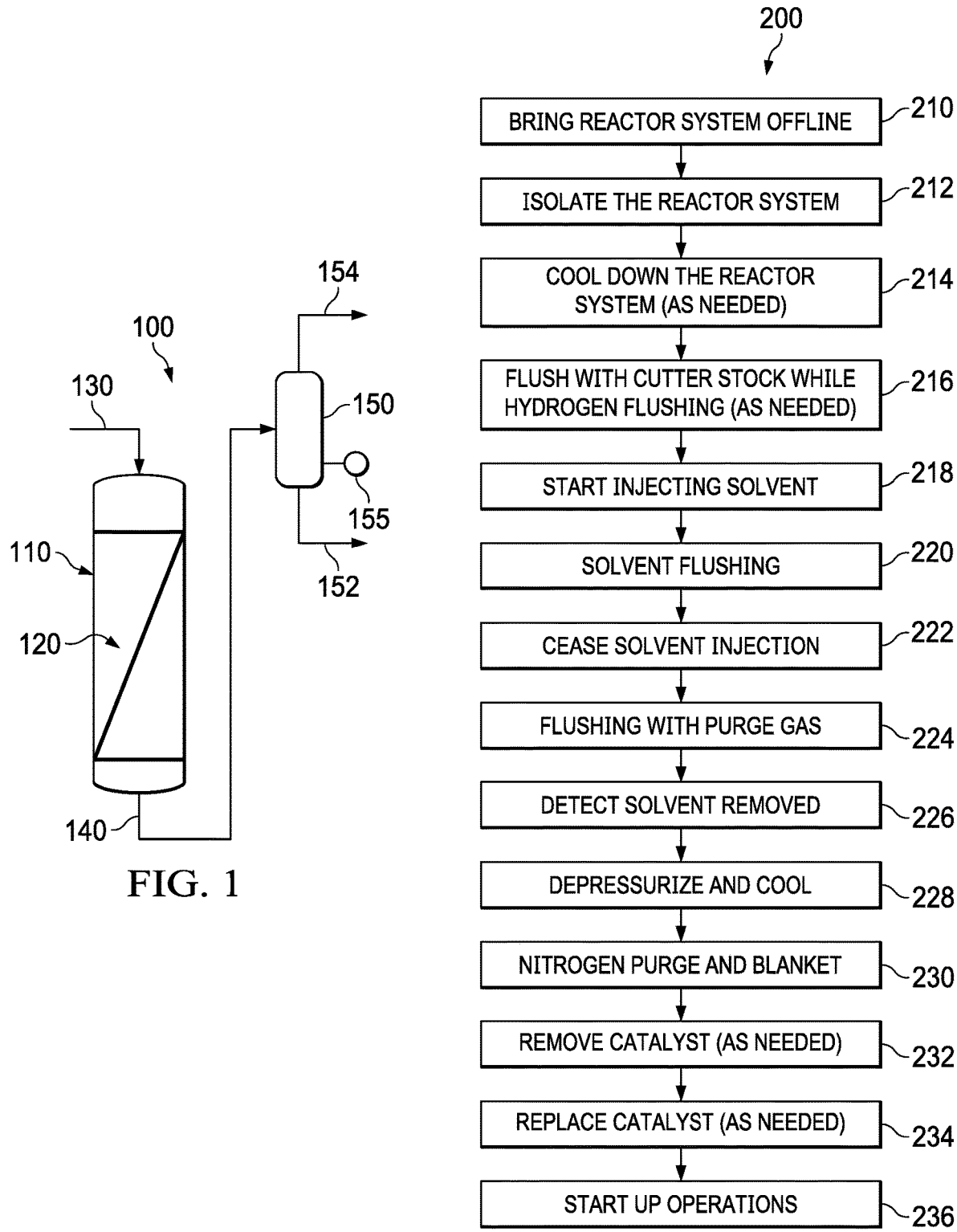

CATALYTIC REACTOR SYSTEM TREATMENT PROCESSES

BACKGROUND

1. Field of the Invention

The present technology relates to the field of the treatment of reactors that contain a catalytic material to remove contaminants from the catalytic material, and more particularly to the treatment of reactors with a liquid solvent, free of alkane vapor, to remove contaminants from the catalytic materials and the associated process equipment.

2. Description of the Related Art

In oil refineries there are often several catalytic processes. These include catalytic reforming, which is a process used to convert petroleum naphtha, distilled from crude oil (typically having low octane ratings), into a high-octane liquid product called reformate. Reformate is a premium blending stock for producing gasoline. The reforming process includes a reformer pretreater reactor that removes sulfur from the feedstock of low-octane linear hydrocarbons (paraffins) to a very low concentration and the reformer reactor then converts the desulfurized feedstock into branched alkanes (iso-paraffins) and cyclic naphthenes, which are then partially dehydrogenated to produce high-octane aromatic hydrocarbons. The dehydrogenation also produces significant amounts of byproduct hydrogen gas, which is fed into another refinery process, such as hydrocracking. In the catalytic hydrocracking process, heavier-than-naphtha crude distillates (e.g. heating oil) are "cracked" in the presence of hydrogen and the catalyst to produce more valuable lighter distillates suitable for blending into gasoline. Sulfur removed as hydrogen sulfide in the pretreater is processed to produce sulfur.

Another common process uses catalytic reactors supplied with hydrogen gas (which may be sourced from the reformers) to remove sulfur and other undesirable impurities from fractions of crude distillate (heavier than naphtha) to produce light oils, such as diesel, heating oil, and kerosene/jet fuel. In these catalytic desulfurization hydrotreating reactors the removed sulfur is in the form of hydrogen sulfide, which is a product that may be converted to sulfur.

It is common in oil refineries and chemical plants to conduct "turnarounds" during which catalytic materials in reactors that are integral to the continuous manufacturing process are regenerated and/or replaced with fresh catalyst. During these turnarounds, the reactor is of necessity "off-line" and cannot convert an incoming stream of charge ("feedstock") to a more valued catalytically modified product stream. Because this cannot be achieved, the charge normally supplied to the reactor is either inventoried into storage facilities, or if supplied by third parties, the supply is halted. Regardless, the turnaround means that expensive processing equipment, including the reactor and downstream processes reliant upon the reactor product as its charge stock are idled. Idling or "down-time" of expensive capital equipment incurs economic costs, and it is desirable to minimize these costs, as far as possible. One way of reducing these economic costs is to find ways to reduce the time period that the process equipment is idled.

In addition to the economic imperative to reduce downtime, it is also necessary to meet all applicable federal and state regulations. These include, for example, Environmental Protection Agency and Occupational Safety and Health Administration (OSHA) regulations and guidelines that apply to the oil and chemical industries to maintain and protect the environment, and to provide worker safety, respectively. In response to regulations, many refineries and chemical plants have installed Flare Gas Recovery Units ("FGRUs"). These are systems designed to minimize or eliminate the flaring of off-gasses from an oil refinery, for example, subject to flow rate, BTU value (heating value) and temperature parameters.

Within the afore-mentioned constraints, among others, it remains necessary to from time to time replace, replenish or regenerate reactor catalysts by removing contaminants that accumulate over time as the catalyst is being utilized.

SUMMARY

In an exemplary embodiment there is provided a method of treating a catalyst-containing reactor system with a liquid solvent to remove contaminants, such as but not limited to LEL (lower explosive limit substances), $H_2S$, benzene, VOCs (volatile organic compounds), gums and like substances that cause increased pressure drop across the reactor system and/or cause loss of catalyst effectiveness. The method includes, but is not limited to, the steps of: bringing the reactor system off-line; and isolating the reactor system to be treated from upstream and downstream equipment. Once isolated, injecting a non-aqueous liquid solvent into the reactor system, via an injection point, and into the vessel containing the catalyst. The method includes maintaining the solvent in a liquid state while it flows through the reactor system, from the injection point to an exit point, thereby removing contaminants from the reactor system, while a hydrogen-rich gas also flows through the system. In some instances, where appropriate, the liquid solvent may be recirculated continuously through the reactor system. The method is characterized further in that it is free of the injecting of a carrier gas comprising alkanes selected from methane, ethane, propane, butane and pentane into the reactor system.

An exemplary method may also utilize a solvent includes aromatic components, such as xylene as the non-aqueous liquid solvent.

An exemplary method may include flushing the reactor system with sufficient liquid solvent to substantially cover internal surfaces (i.e. cover about 70 to 100% of surfaces) to remove contaminants from the reactor's internal surfaces, during a step of flowing the solvent through the system.

An exemplary method may include a liquid solvent selected from any one or more of benzene, toluene and xylene, and chemical derivatives thereof.

An exemplary method may include, before the step of injecting, optionally flushing the reactor system with a cutter stock, or an uncracked feedstock.

An exemplary method may include the step of flushing the reactor system internally with a hydrogen-rich purge gas to cool down the reactor system, prior to the step of injecting the liquid solvent. Flushing with hydrogen-rich gas is generally continued as solvent is being injected until the very end of the process when solvent injection is terminated, and the reactor system is purged with nitrogen gas to remove any residual hydrogen.

An exemplary method may further include dumping catalyst from the reactor system under a nitrogen blanket.

BRIEF DESCRIPTION OF THE DRAWINGS

The foregoing aspects and many of the attendant advantages, of the present technology will become more readily appreciated by reference to the following Detailed Description, when taken in conjunction with the accompanying simplified drawings of exemplary embodiments. The drawings, briefly described here below, are not to scale, are presented for ease of explanation and do not limit the scope of the inventions recited in the accompanying patent claims.

FIG. 1 is a schematic diagram of a portion of a reactor system depicting a packed reactor containing a catalyst bed, and a downstream knockout drum.

FIG. 2 is a Flow Diagram of the main steps in an exemplary embodiment of the reactor system treatment process.

DETAILED DESCRIPTION

The following non-limiting detailed descriptions of examples of embodiments of the invention may refer to appended Figure drawings and are not limited to the drawings, which are merely presented for enhancing explanations of features of the technology. In addition, the detailed descriptions may refer to particular terms of art, some of which are defined herein, as appropriate and as necessary for clarity.

In the specification and claims, the term "contaminants" should be read to include those substances that are deleterious to the reactor system and that should desirably be removed during the reactor system treatment process. These include but are not limited to LEL (lower explosive limit substances), $H_2S$, VOCs, (volatile organic compounds) gums and like substances that cause increased pressure drop across the reactor system.

The technology for treatment of a catalytic reactor system as described herein is especially suited for reformer pretreaters, catalytic hydro-desulfurizers, and like catalytic reactor systems, all of which are used in oil refineries, but are not limited to these refinery applications.

The fundamental issue in the regeneration or replacement of exhausted catalysts in packed bed reactors is the cost of downtime. When the reactors are taken off-line, they produce no reactor products, whether it be reformate, kerosene, jet fuel, diesel or hydrogen or other product. Thus, production is reduced while expensive capital equipment is idle.

In the specification and claims, the term "liquid phase" or "liquid state" means that the solvent used in the technology is liquid, albeit that a portion of it will be vapor because every liquid has a vapor pressure at equilibrium with it. The solvent is a pumpable injected liquid at the conditions of reactor system injection and treatment and is not vaporized, either at injection or in the system being treated.

Conventionally, the treatment process to regenerate catalysts was lengthy, because it relies upon stripping off the contaminants, that reduce the catalyst effectiveness, from the catalyst surfaces using hot gasses. These methods are known as "hot stripping" and "extended dry gas purging." These processes can be accelerated by increasing the temperature of the process, but that could result in catalyst damage. As an alternative, some propose the use of a gaseous or vapor solvent to increase mass flow transfer rates from the catalyst surfaces. In this process the solvent removes light hydrocarbons deposited as contaminants on the catalyst surfaces as a vapor. It is claimed that this vapor recovery process for catalyst treatment reduces the downtime from a typical 90 hours to just over 60 hours which is a considerable saving.

The present technology, as described in more detail below, utilizes a non-aqueous liquid solvent that remains in the liquid phase throughout the catalyst treatment operation to strip the contaminants from the catalyst, so that it can either be reused as regenerated catalyst or removed as spent catalyst and replaced with fresh catalyst. This process, as described herein, can be conducted from reactor system shutdown to a status of being safely ready for mechanical work in about 40 to about 60 hours. This represents a considerable saving in downtime for the equipment. In general, the operator will measure the shutdown time from "oil out" to "ready to install blinds."

FIG. 1 illustrates schematically a simplified example of a reactor system 100, for purposes of explaining the technology more easily, without any of the usual associated ancillary equipment for it to be operative: pumps, heat exchangers, compressors, etc. The exemplified reactor system 100 includes a packed reactor 110 that is usually a vertical column, at least partially packed with catalyst in a bed 120. Often refineries operate a pair, or a train, of reactors in parallel so that if one reactor or train of reactors must be treated, the other parallel reactor or train is still operative. In this example, charge stock (naphtha or kerosene or heating oil precursors) enters at the inlet 130 at the top in the form of a vapor, and the desulfurized product exits at the outlet at the base 140. Isolation of the reactor system 100 will depend on the specific design of the system, but, at a minimum, charge stock supply is stopped, and appropriate steps are taken to isolate the reactor inlet from charge stock. Likewise, at the reactor outlets steps are taken to isolate the outlets from pipelines to storage tanks or blending. Hydrogen flow is continued. In the exemplary schematic of FIG. 1, the reactor product goes to a liquid/vapor separator drum 150 equipped with a liquid level detector that can be monitored remotely, in a control room, like most of the instrumentation. Vapor exits in line 154 at the top of drum 150, and liquid exits in line 152 from the base of drum 150. In this simplified schematic diagram, other flows, such as hydrogen gas are not shown.

Referring to FIG. 2, this is an exemplary and simplified flowchart 200 of the main steps in the presently-provided reactor system treatment process. In step 210 the reactor system is brought off-line. This means that the rate of charge to the reactor is slowed, and the feedstock may be switched to an uncracked feedstock, for example. Steps are taken to isolate 212 the reactor system from any parallel system, and from upstream or downstream operations. The exact nature of these isolation steps will vary based on the particular reactor system design.

Once the reactor system is isolated, it can be cooled and depressurized in step 214, for example, to the range 200 to 500 psi and temperatures in the range 300 to 500° F. Depending upon the feedstock, the design and the operation of the reactor system, it is then flushed in step 216 for from about 2 to about 4 hours by circulating through the reactor system a cutter stock such as diesel, kerosene, or LCO and the like.

Flushing of the reactor system with the cutter stock is an optional step, and if used, it continues until either a desired outlet cutter stock condition is achieved, for example, as to color, specific gravity, and the like physical condition, or a time period has elapsed.

In the exemplary embodiment, the solvent is to be injected and maintained in a liquid state, which is a function of both temperature and pressure in that a higher temperature can be used if the pressure is higher to maintain a liquid phase. Having achieved the desired temperature and pressure in the reactor system, non-aqueous solvent injection can commence in step 218 at a point in the reactor system, such as for example, at the feed control valve upstream of the feed heat exchangers, which are upstream reactor heater and reactor inlet. Continuous injection flushes the reactor system with a non-aqueous solvent, in step 220.

The non-aqueous solvent is in a liquid phase as charged to the reactor system. The temperature and pressure conditions are maintained in the reactor system such that the non-aqueous solvent remains in a liquid phase during flushing of the system in step 220. In general, in exemplary embodiments, temperatures may range from about 300 to about 500° F. and pressures may range from about 200 to about 500 psig may be usefully applied in the reactor system. Of course, when the solvent is one that has known physical properties, or mixture of chemicals with known physical properties, the temperature and pressure can be determined from these physical properties taking into account the interplay that higher pressure at the same temperature tends to liquefaction, and higher temperature at the same pressure tends to vaporization.

The solvent may be continuously injected for flushing into the reactor system in step 220 for a period of from about 1 to about 4 hours. The flushing may cover or flow over substantially all surfaces in the reactor being treated, in other words the solvent may cover from about 70 to over 90% of the internal surfaces to clean these surfaces of contaminants.

In step 222, solvent injection is stopped, but of course there is considerable liquid hold-up in the system. To flush the reactor system of the liquid solvent, in step 224 the system is flushed with a hydrogen-rich purge gas, which is almost always continuously flowing through the reactor system during preceding steps 212-222, or which may be introduced after the solvent flush treatment. At this stage the temperature in the reactor system is an exemplary embodiment may be in the range from about 250 to about 500° F. and pressure in the range from about 150 to about 500 psig. The purge continues until the rate of accumulation of solvent separated out from the hydrogen-rich exiting gas slows to indicate solvent has been substantially removed from the system. The rate of accumulation can be tracked, for example, using liquid detector 155 that monitors gas/liquid separator drum 150, or another means, in step 226.

The exemplary treatment process proceeds to step 228 in which the reactor system is depressurized and cooled to the range of about 90 to about 120° F. and about 5 to about 50 psig. The cooling procedure may be carried out with hydrogen-rich gas at high pressure supplied by a compressor. At the end of the cooldown, because compressors often cannot be turned down sufficiently, the operator may switch to nitrogen gas, or the like. Once these conditions are reached, step 230 commences by flushing the reactor system with nitrogen and purging the residual hydrogen-rich gas from the reactor system. The reactor catalyst is, at this point in a nitrogen environment, referred to as a "nitrogen blanket."

With nitrogen blanketing in place, the inlet and outlet of the reactor vessel can be blinded off as the first step before replacing catalyst or skimming catalyst, etc. As pointed out before, the operator will measure the shutdown time from "oil out" (step 210) to "ready to install blinds" (conclusion of step 230).

The reactor can be opened in step 232 and the catalyst removed from the packed bed and replaced with fresh catalyst in step 234, if that is required. Otherwise, steps 232 and 234 can be bypassed, and step 236 of reactor system startup can commence. Of course, the facility may also carry out work on other equipment in the reactor system or the low pressure or downstream equipment from the high pressure reactor system. Typically, no such work will commence until the reactor is depressurized, so all work is limited on timeline to the reactor clearing. Moreover, time taken for these activities are not appropriately counted as part of the catalyst regeneration downtime but as maintenance downtime. So, this time should be deducted from the total measured downtime.

If the catalyst must be removed, and replaced, then once catalyst has been replaced, and the reactor system sealed to contain the fresh catalyst, startup operations can commence in step 232.

While examples of embodiments of the technology have been presented and described in text, and some examples also by way of illustration, it will be appreciated that various changes and modifications may be made in the described technology without departing from the scope of the inventions, which are set forth in and only limited by the scope of the appended patent claims, as properly interpreted and construed.

The invention claimed is:

1. A method of treating a catalyst-containing reactor system with a non-aqueous liquid solvent to remove contaminants comprising at least one of, VOCs, LELs, benzene, and gums from the catalyst-containing reactor system, the method including the steps of:
   bringing off-line the catalyst-containing reactor system;
   isolating the catalyst-containing reactor system;
   injecting the non-aqueous liquid solvent into the catalyst-containing reactor system at an injection point; and
   maintaining the non-aqueous liquid solvent in a liquid state while the non-aqueous liquid solvent flows through the catalyst-containing reactor system, from the injection point to an exit point, thereby removing the contaminants comprising the at least one of, VOCs, LELs, benzene, and gums from the catalyst-containing reactor system.

2. The method of claim 1, further comprising flowing a carrier gas through the isolated catalyst-containing reactor system.

3. The method of claim 1, wherein the step of flowing the non-aqueous liquid solvent through the catalyst-containing reactor system includes flushing the catalyst-containing reactor system to substantially cover internal surfaces to remove the contaminants comprising the at least one of, VOCs, LELs, benzene, and gums from the internal surfaces.

4. The method of claim 1, wherein the non-aqueous liquid solvent comprises an aromatic solvent.

5. The method of claim 1, further comprising before the step of injecting the non-aqueous liquid solvent, flushing the catalyst-containing reactor system with a cutter stock.

6. The method of claim 1, further comprising, after the step of maintaining the non-aqueous liquid solvent in the liquid state, cooling and depressurizing the catalyst-containing reactor system with a high-pressure gas.

7. The method of claim 2, wherein the carrier gas comprises a hydrogen-rich purge gas, wherein further the hydrogen-rich purge gas is free of alkanes selected from the group consisting of methane, ethane, propane, butane, and pentane and further comprising, during the step of maintaining the non-aqueous liquid solvent in the liquid state, continuously flushing the catalyst-containing reactor system internally with the hydrogen-rich purge gas.

8. The method of claim 6, wherein the high-pressure gas comprises a hydrogen-rich gas.

9. The method of claim 7, further comprising:
   terminating the step of injecting the non-aqueous liquid solvent,
   terminating continuous flushing with the hydrogen-rich purge gas, and sweeping the catalyst-containing reactor system internally with a nitrogen gas to remove residual hydrogen.

10. The method of claim 9, further comprising dumping catalyst from the catalyst-containing reactor system after sweeping with the nitrogen gas to remove residual hydrogen.

11. The method of claim 9, wherein the step of terminating continuous flushing with the hydrogen-rich purge gas is based on the non-aqueous liquid solvent detected below a predetermined rate.

12. A method of treating a catalyst-containing reactor system with a non-aqueous liquid solvent to remove contaminants comprising at least one of, VOCs, LELs, benzene, and gums from the catalyst-containing reactor system, the method including the steps of:
bringing off-line the catalyst-containing reactor system;
isolating the catalyst-containing reactor system;
flowing a carrier gas through the isolated catalyst-containing reactor system;
flushing the catalyst-containing reactor system with a liquid non-aqueous cutter stock;
injecting the non-aqueous liquid solvent into the catalyst-containing reactor system at an injection point while continuing to flow the carrier gas through the catalyst-containing reactor system;
maintaining the non-aqueous liquid solvent in a liquid state while the non-aqueous liquid solvent flows through the catalyst-containing reactor system, from the injection point to an exit point, thereby removing the contaminants comprising the at least one of, VOCs, LELs, benzene, and gums from the catalyst-containing reactor system; and
cooling and depressurizing the catalyst-containing reactor system with a high-pressure gas.

13. The method of claim 12, wherein the step of flowing the non-aqueous liquid solvent through the catalyst-containing reactor system includes flushing the catalyst-containing reactor system to substantially cover internal surfaces and permeate spaces between the catalyst to remove the contaminants comprising the at least one of, VOCs, LELs, benzene, and gums from the internal surfaces of the catalyst-containing reactor system and catalyst.

14. The method of claim 12, wherein the non-aqueous liquid solvent comprises xylene.

15. The method of claim 12, wherein the carrier gas comprises a first stream of hydrogen-rich gas, and wherein the first stream of hydrogen-rich gas is free of alkanes selected from the group consisting of methane, ethane, propane, butane, and pentane.

16. The method of claim 15, wherein the high-pressure gas comprises a second stream of hydrogen-rich gas and further comprising:

during the step of flowing the first stream of hydrogen-rich gas through the isolated catalyst-containing reactor system, reducing the temperature and pressure of the catalyst-containing reactor system;
terminating the step of injecting non-aqueous liquid solvent;
terminating the flow of the first stream of hydrogen-rich gas; band
after the step of cooling and depressurizing the catalyst-containing reactor system with the high-pressure gas, sweeping the catalyst-containing reactor system internally with a nitrogen gas to remove residual hydrogen.

17. The method of claim 15, further comprising dumping catalyst from the catalyst-containing reactor system.

18. A method of treating a catalyst-containing reactor system with a non-aqueous liquid solvent to remove contaminants comprising at least one of, VOCs, LELs, benzene, and gums from the catalyst-containing reactor system, the method including the steps of:
isolating the catalyst-containing reactor system;
reducing a temperature and a pressure of the isolated catalyst-containing reactor system by flushing with a first stream of hydrogen-rich gas;
injecting the non-aqueous liquid solvent into the catalyst-containing reactor system at an injection point while continuously flowing the first stream of hydrogen-rich gas through the catalyst-containing reactor system;
maintaining the non-aqueous liquid solvent in a liquid state while flowing the non-aqueous liquid solvent continuously through the catalyst-containing reactor system, thereby removing the contaminants comprising the at least one of, VOCs, LELs, benzene, and gums from the catalyst-containing reactor system;
terminating the step of injecting the non-aqueous liquid solvent and terminating the continuous flowing of the first stream of hydrogen-rich gas; and
cooling and depressurizing the catalyst-containing reactor system with a high-pressure gas.

19. The method of claim 18, wherein the first stream of hydrogen-rich gas is free of alkanes selected from methane, ethane, propane, and pentane, wherein further the high-pressure gas is a second stream of hydrogen-rich gas, and further comprising:
after the step of cooling and depressurizing the catalyst-containing reactor system, sweeping the catalyst-containing reactor system internally with nitrogen gas to remove residual hydrogen.

20. The method of claim 18, wherein the non-aqueous liquid solvent comprises xylene.

* * * * *

UNITED STATES PATENT AND TRADEMARK OFFICE
CERTIFICATE OF CORRECTION

| | | |
|---|---|---|
| PATENT NO. | : 11,338,280 B2 | Page 1 of 1 |
| APPLICATION NO. | : 16/780074 | |
| DATED | : May 24, 2022 | |
| INVENTOR(S) | : Blake Montgomery | |

It is certified that error appears in the above-identified patent and that said Letters Patent is hereby corrected as shown below:

In the Claims

In Column 6, Line 21, replace "at least one of, VOCs," with --at least one of VOCs,--.

In Column 6, Lines 41-42, replace "at least one of, VOCs," with --at least one of VOCs,--.

In Column 7, Line 13, replace "at least one of, VOCs," with --at least one of VOCs,--.

In Column 8, Line 8, replace "band" with --and--.

Signed and Sealed this
Twenty-fourth Day of October, 2023

Katherine Kelly Vidal
*Director of the United States Patent and Trademark Office*